(No Model.) 2 Sheets—Sheet 1.
J. M. GASTON.
BICYCLE REST OR SUPPORT.
No. 559,698. Patented May 5, 1896.
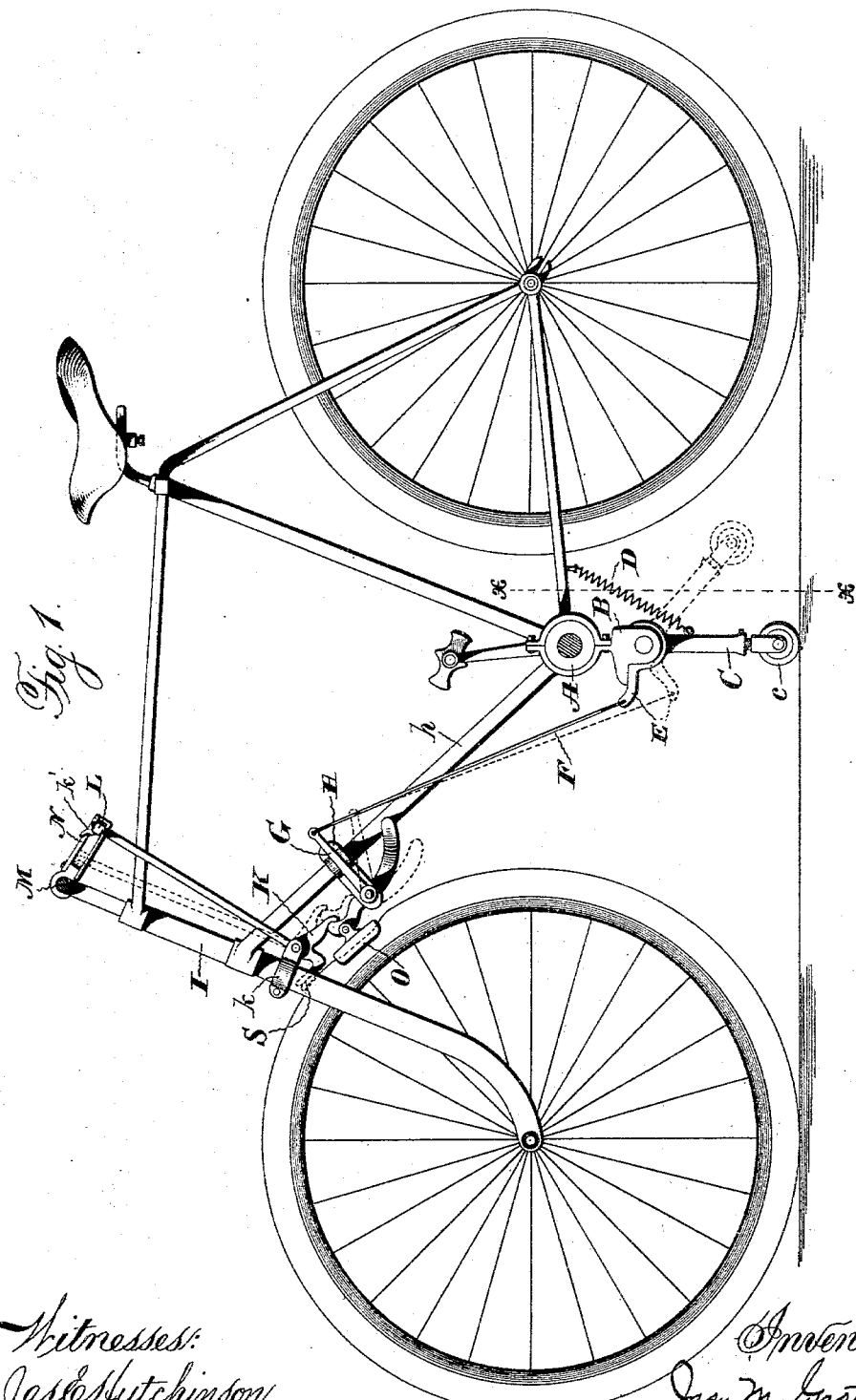
Witnesses:
Jas. E. Hutchinson.
Henry C. Hazard.
Inventor.
Jas. M. Gaston, by
Prindle and Russell, his Attys.

(No Model.) 2 Sheets—Sheet 2.
J. M. GASTON.
BICYCLE REST OR SUPPORT.
No. 559,698. Patented May 5, 1896.
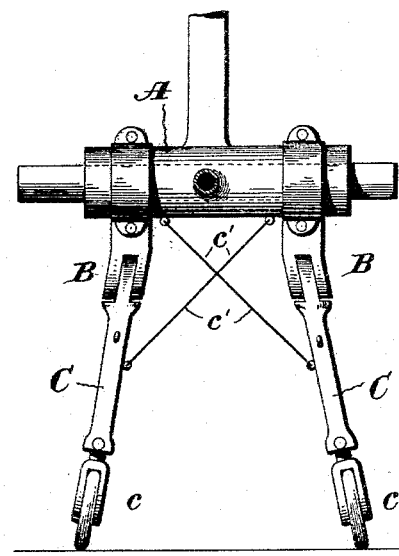
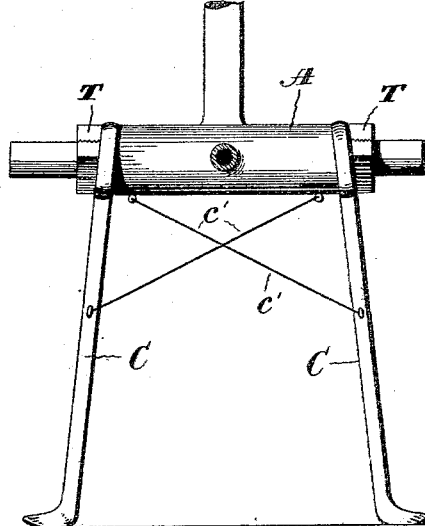
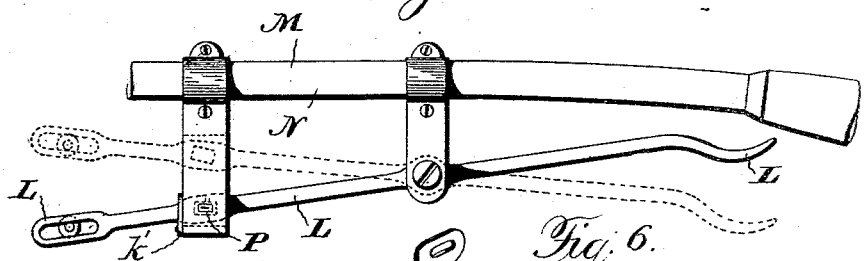
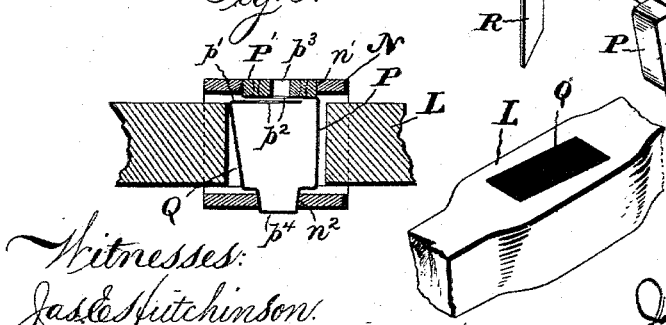
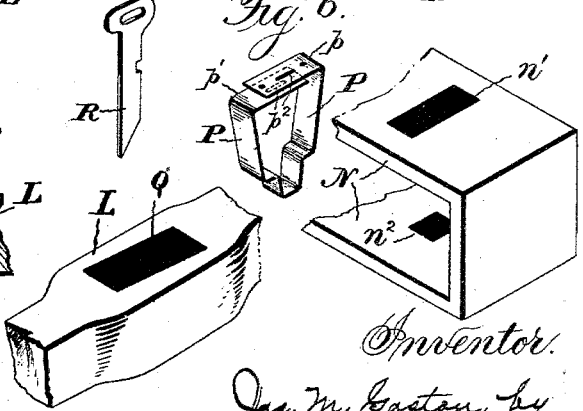
Witnesses:
Jas. E. Hutchinson.
Henry C. Hazard.
Inventor.
Jas. M. Gaston, by
Prindle and Russell, his Attys.

United States Patent Office.

JAMES MONROE GASTON, OF LOUISVILLE, KENTUCKY.

BICYCLE REST OR SUPPORT.

SPECIFICATION forming part of Letters Patent No. 559,698, dated May 5, 1896.

Application filed December 6, 1894. Serial No. 530,994. (No model.)

*To all whom it may concern:*

Be it known that I, JAMES MONROE GASTON, of Louisville, in the county of Jefferson, and in the State of Kentucky, have invented certain new and useful Improvements in Bicycle Rests or Supports; and I do hereby declare that the following is a full, clear, and exact description thereof, reference being had to the accompanying drawings, in which—

Figure 1 is a side view of a bicycle to which my improvements have been applied; Fig. 2, a section on line $x$ $x$, Fig. 1; Fig. 3, a similar view showing a different manner of attaching the pivoted legs. Fig. 4 is a detail plan view of a portion of the handle-bar and the attached parts; Fig. 5, a section through the locking device, and Fig. 6 a perspective view of the parts of said locking device separated.

Letters of like name and kind refer to like parts in each of the figures.

The object of my invention is to provide a rest or support for bicycles, either for use in mounting and dismounting or for the use of beginners or those learning to ride; and to accomplish this object, and others to hereinafter appear, my invention consists in the mechanism having the construction and combination of parts hereinafter specified.

My invention is designed for use with the well-known safety form of bicycles, and in applying it to bicycles already made I clip or otherwise fasten to opposite ends of the driving or crank shaft journal or sheath A thereof two depending lugs B and B, to each of which is pivoted a rod C, that forms a leg or support and at its outer end carries a wheel $c$ to engage the ground. The wheel is detachably connected to the rod C to enable the substitution therefor of a ground-engaging piece in the form of a foot.

The lugs B and B do not project at right angles from the sheath A, but stand obliquely so that the legs C and C diverge toward their wheel-carrying ends and thus afford well-separated bearing-points upon the ground. Preferably the two legs C and C are braced by two light diagonally-extending rods $c'$ and $c'$. Said legs are normally kept raised off the ground by means of a coiled spring D, that has one end connected therewith and the other end attached to some convenient part of the bicycle-frame.

Connected with the two legs C and C is an arm E, that in turn is connected by a rod or bar F to an arm G, which is pivoted between its ends to a clip or bracket H, secured to the frame-bar $h$, near its point of connection with the steering-head I, while engaging said arm G to rock the same is the lower end of a lever K, that is pivoted to a clip or bracket $k$, attached to the steering-head I, and is extended upward with its upper end engaged by the inner end of a hand-lever L, that is pivoted to the handle-bar M.

By moving the hand-lever L in the proper direction the legs C and C will, through the described connection, be moved against the stress of the spring D to place the wheels $c$ and $c$ upon the ground. To hold the parts in this position, the lever L is adapted to be engaged by a pivoted dog or latch $k'$, that is located near the rear end of a block or bracket N, that has a slot $n$, through which the inner end of the lever passes and in which it moves backward and forward. To release the lever L and thus permit the spring D to act to lift the wheels from the ground, it is necessary simply to disengage the dog $k'$ from the bracket N.

When the mechanism thus far described is employed, the legs C and C may either be used simply to temporarily hold the bicycle upright to permit easy mounting and dismounting, or, with the wheels $c$ and $c$ attached to the legs, they may be used by learners or beginners to brace or hold the bicycle from falling to either side as it is propelled along.

When the rest or support is to be used simply for mounting and dismounting, I propose to use means to lock the bicycle when it is not to be used, so as to enable it to be left in safety against being ridden by unauthorized persons. To accomplish this object, I connect to the under side of the front end of the arm G a shoe O, that will be pressed with such force against the tire of the front wheel as to make revolution of the latter impossible. Movement of said shoe into contact with the wheel is caused by rearward movement of the upper end of the lever K when the same is actuated to set the support or rest into ground-engaging position, and when the rearward limit of motion of said lever K is reached I hold the same there, and hence the shoe O in engagement with the wheel-tire, by means of a key-actuated lock P, that engages openings $n'$ and $n^2$ in the opposite sides of the bracket N, and an opening Q in the lever L, which opening Q is placed in alinement with those in the bracket when the lever L reaches such rearward position.

The lock P consists of a piece of spring sheet metal having the general shape of a rectangle, with two disconnected overlapping sides $p$ and $p'$, the former being the outer one and riveted or otherwise fastened to a block or plate P' of such size and shape as to fit the opening $n'$ in the bracket N, and the inner one $p'$ being free. Each of said sides $p$ and $p'$ is provided with a narrow slot or slit $p^2$, and a similar slot $p^3$ is formed in the plate P' in alinement with the one in the attached side $p$. When the slot $p^2$ in the free side $p'$ is in alinement with the other two, the distance between the top and bottom of the lock P is less than the vertical limits of the opening $n'$, and hence the lock can be passed through the latter; but normally the free side $p'$ is sprung or expanded to cause its lower end to project beyond the lower end of the opening, and hence engage the inner side of the bracket N and prevent the withdrawal of the lock. The side of the lock opposite that where the sides overlap has an offset or projecting portion $p^4$ to engage the opening $n^2$ in the bracket N.

To remove the lock P, and thus release the lever K, a flat key R is employed that has a beveled or obliquely cut off end, which, when the key is inserted through the slot $p^3$, will engage the upper side of the slot $p^2$ in the free side $p'$ and lift or cam up the said side to raise its lower end so as to permit the withdrawal of the lock P through the opening $n'$. Preferably the shank of the key has a notch in its upper edge into which the upper edge of the slot $p^2$ in the free side of the lock can spring, and thus hold lock and key together. As the shoe O engages the wheel at a point eccentric to the steering-post, said wheel will thus be held in alinement with the rear wheel and the bicycle enabled to stand alone in an upright position, ready for instant use upon releasing the locking-shoe O. To add to the firmness with which the front wheel is thus held, the rear end of the arm G is adapted to engage the bicycle-frame bar $h$ when the shoe O engages the wheel. Said shoe is constructed so as to be readily attached to and removed from the arm G to permit the bicycle to be ridden, as by learners, with the legs C and C thrown down.

The lever K is provided with a shoe S of usual construction to serve as an ordinary friction-brake, and such shoe is applied to the wheel by moving the upper end of said lever forward, or in the direction opposite to that required to lower the legs C and C.

In building new bicycles the use of the clips B and B can be avoided simply by making the crank-shaft sheath or journal long enough to admit of the rods C and C being pivoted directly upon it, and employing a nut T with an inclined or beveled inner face to hold each rod in place against a similarly-inclined shoulder upon the sheath or journal.

Where the frame-bar $h$ is curved, as in the ladies' style of bicycle, a bar or rod F cannot be used as the connection between the arms E and G, but in lieu thereof a cord or chain will be employed.

It will be observed that the setting of the rest or support to ground-engaging position, and the application and release of the locking-shoe O, and, as well, the lifting of the rest or support can be done while the rider is mounted, all of such operations being effected merely by the manipulation of the hand-lever L.

My mechanism is simple in construction, and adds but little weight to the bicycle.

Having thus described my invention, what I claim is—

1. In a bicycle support or rest, the combination with a bicycle and the brake-lever thereof, of legs movable into and out of contact with the ground, and connections between said lever and such legs, the movement of said lever in one direction operating to apply the brake, and in the opposite direction, to move the legs in contact with the ground, substantially as and for the purpose specified.

2. The combination with a bicycle, a brake-lever, and a brake-shoe actuated by the latter, of legs movable into and out of contact with the ground, connections between the brake-lever and the legs, a lock to hold one of the wheels when the legs are in ground-engaging position, and a connection between said lock and the brake-lever, movement of the latter in one direction operating to apply the brake-shoe, and in the opposite direction to actuate the lock, substantially as and for the purpose described.

3. The combination with a bicycle of a brake-shoe, a locking-shoe, a brake-lever adapted to alternately operate said shoes, legs movable into and out of contact with the ground, and connections between the legs and the brake-lever, said lever operating when moved in one direction to actuate the brake-shoe, and when moved in the opposite direction to actuate the locking-shoe and legs, substantially as and for the purpose specified.

4. The combination with a bicycle, of a lever, two shoes that are adapted to be alternately moved into engagement with the steering-wheel by movement of the lever in opposite directions, and an arm connected with one of said shoes and which is adapted to engage the frame, when the shoe engages the wheel, substantially as and for the purpose shown.

5. In combination, the slotted block or piece, the part to be locked having a slot, and the key-actuated lock to coöperate with the slots in said parts, having a part adapted to be projected beyond, and to be placed within the limits of the slot in said block or piece, said lock being removable from both of said parts to release the same, substantially as and for the purpose specified.

6. In combination, the block or piece having a slot, the part to be locked having a slot, the lock having a spring-actuated member that tends to expand beyond the limits of the first-named slot, and a key having a beveled or inclined portion to engage a slit or slot in said member, to draw the same within the limits of the slot, said lock being removable from the parts to be secured, to release the same, substantially as and for the purpose shown.

In testimony that I claim the foregoing I have hereunto set my hand this 7th day of November, 1894.

JAMES MONROE GASTON.

Witnesses:
ANNA M. RICHARDS,
CHARLES W. LONG.